Jesse V. Henton
INVENTOR.

BY
ATTORNEY

Feb. 23, 1971 J. V. HENTON 3,564,795
PRE-CAST MODULAR BUILDING UNITS WITH UTILITY DUCTS
Filed July 25, 1968 7 Sheets-Sheet 2

Jesse V. Henton
INVENTOR.
BY
ATTORNEY

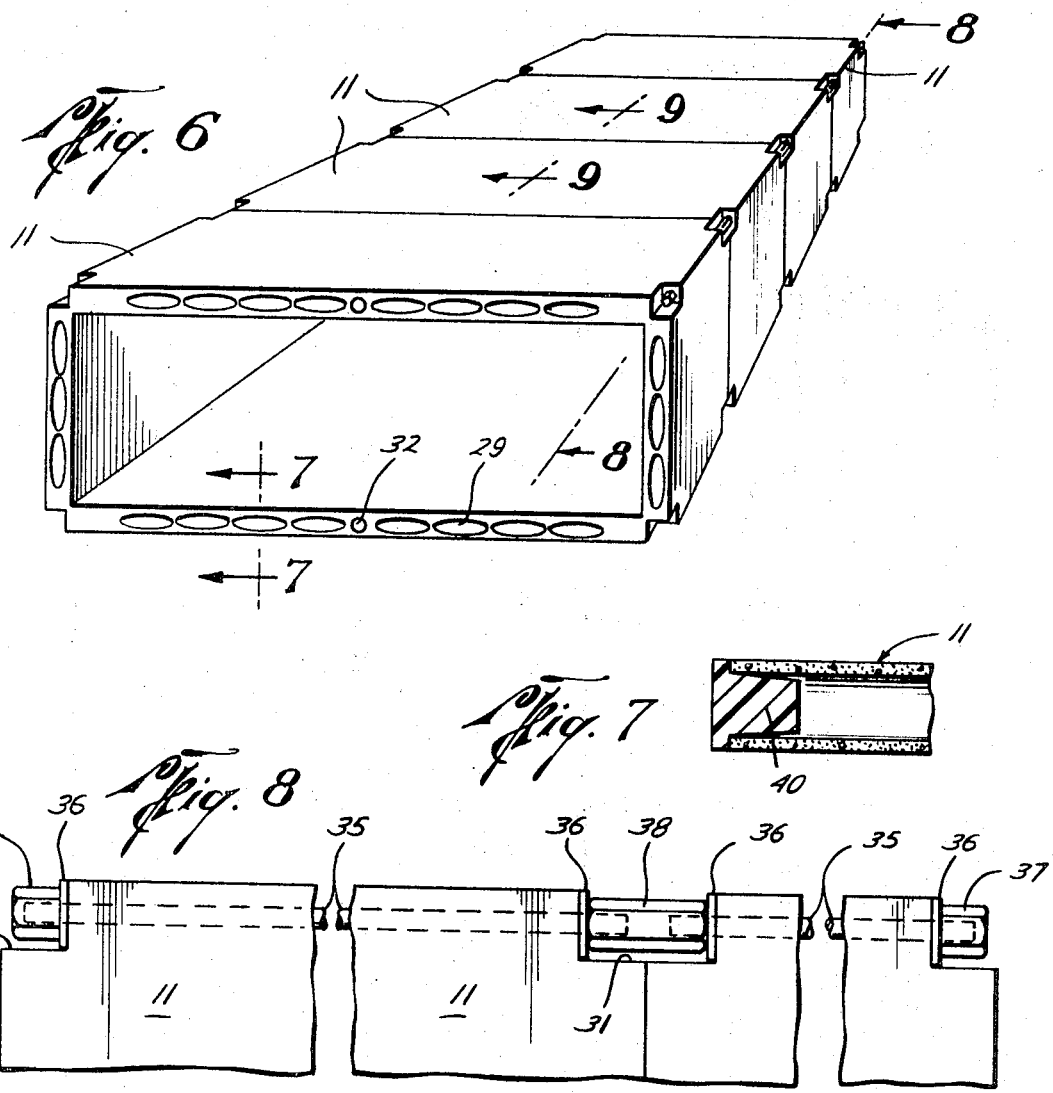
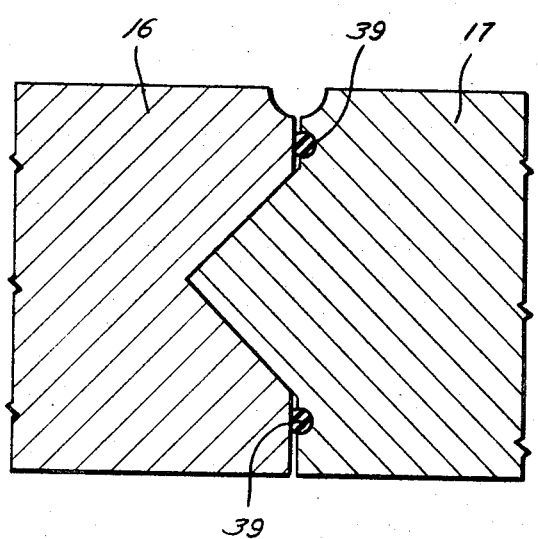

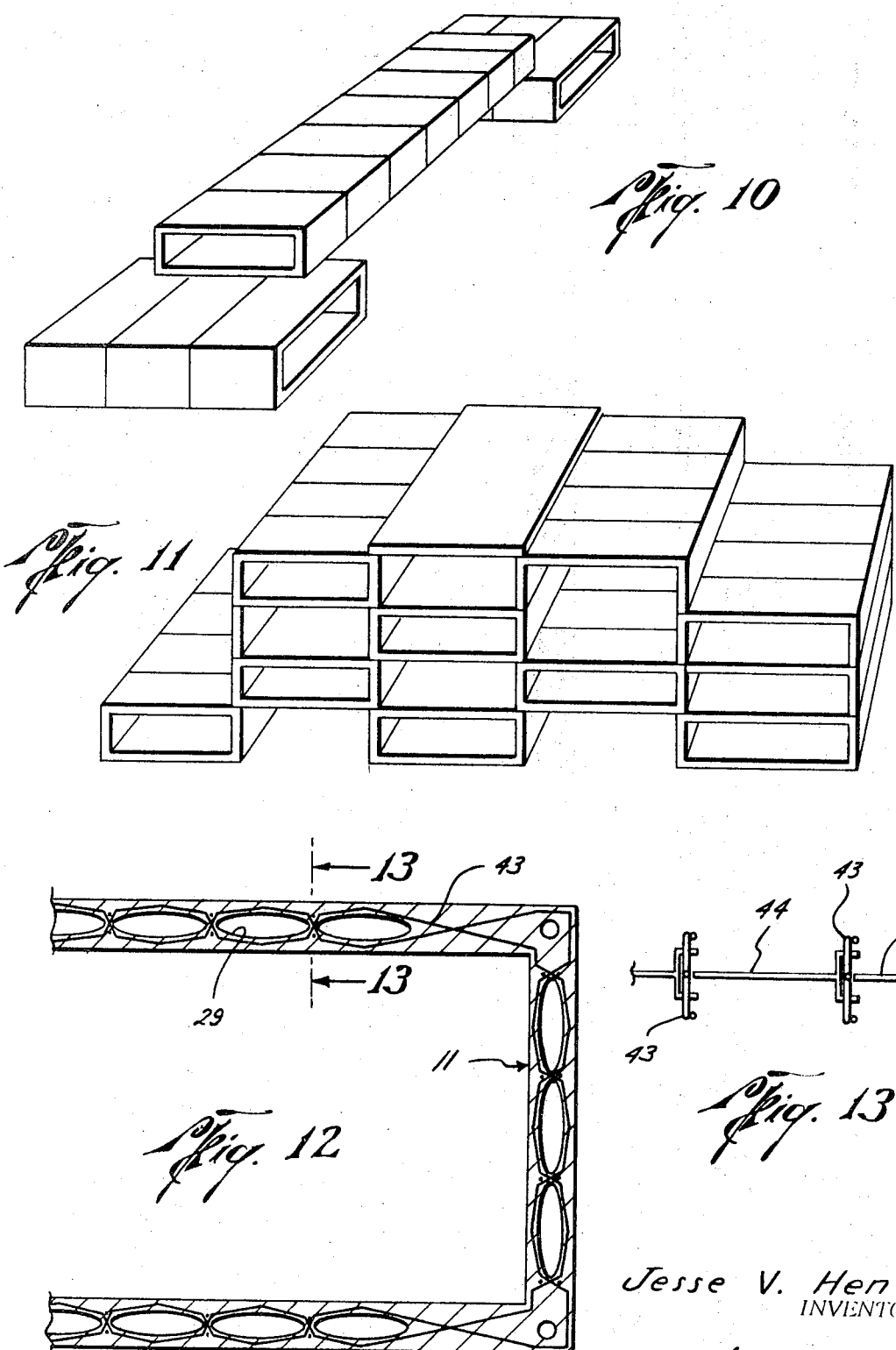

Feb. 23, 1971    J. V. HENTON    3,564,795
PRE-CAST MODULAR BUILDING UNITS WITH UTILITY DUCTS
Filed July 25, 1968    7 Sheets-Sheet 5

Jesse V. Henton
INVENTOR.

BY *Lee R. Larken*

ATTORNEY

Feb. 23, 1971    J. V. HENTON    3,564,795
PRE-CAST MODULAR BUILDING UNITS WITH UTILITY DUCTS
Filed July 25, 1968    7 Sheets-Sheet 6

Jesse V. Henton
INVENTOR.

BY
ATTORNEY

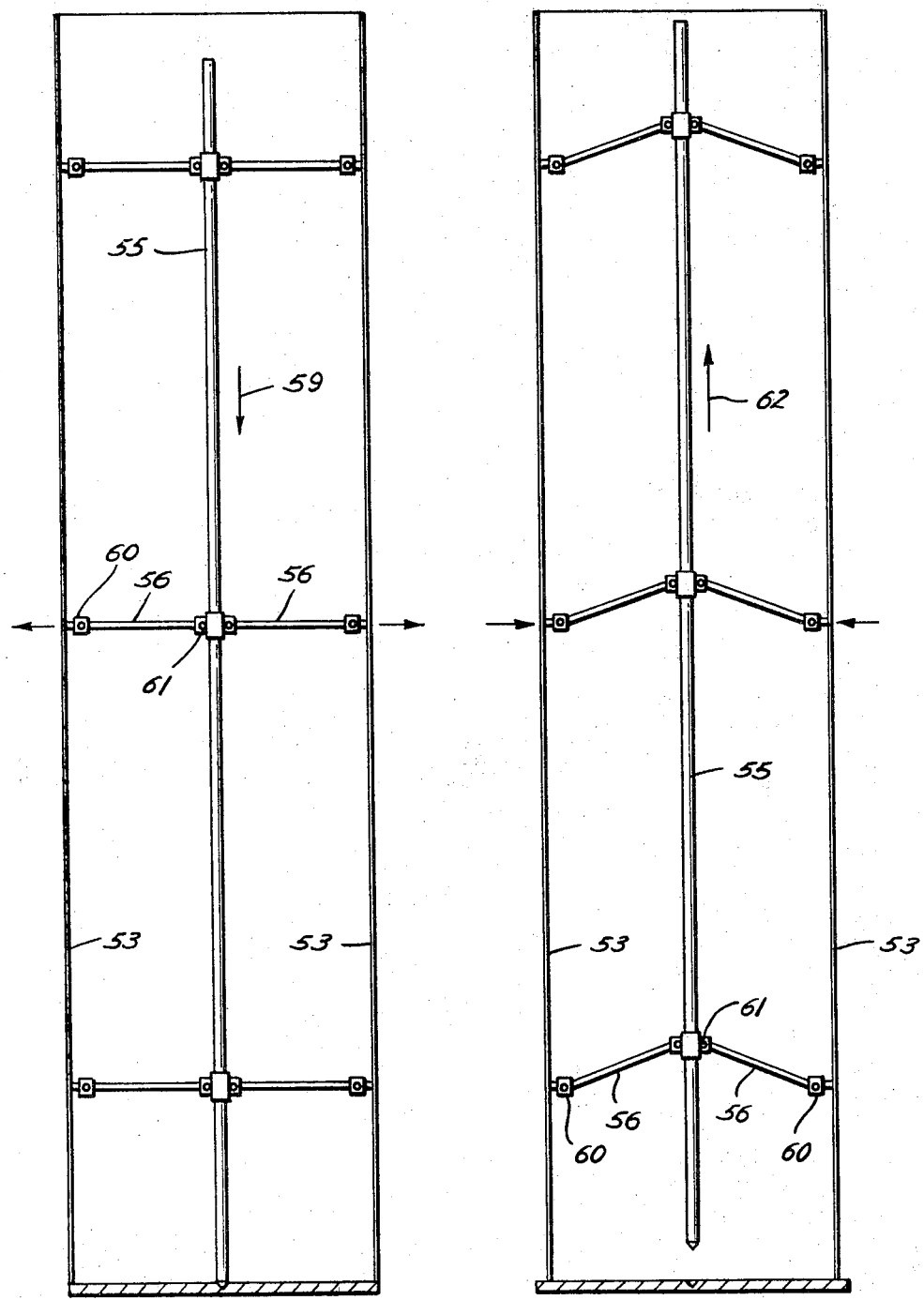

United States Patent Office 3,564,795
Patented Feb. 23, 1971

3,564,795
PRE-CAST MODULAR BUILDING UNITS WITH
UTILITY DUCTS
Jesse Vernon Henton, 906 Rusken St.,
Bryan, Tex. 77801
Filed July 25, 1968, Ser. No. 747,534
Int. Cl. E04b 1/348; E04f 17/08
U.S. Cl. 52—79                              16 Claims

ABSTRACT OF THE DISCLOSURE

A building construction and method for making and using pre-cast modular structural units which can be mass produced, assembled and made habitable at a minimum cost. The building construction unit contemplated is comprised of a plurality of pre-cast modules having utility ducts running generally transverse to the span. The method of the invention contemplates a unique series of steps for casting the modules and assembling them into building units.

This invention relates to a building construction, and method therefor, utilizing pre-cast modular units. More particularly, this invention relates to a building construction and method utilizing modular units pre-cast of an aggregate such as concrete, for example. The modules are so arranged that they can be easily assembled and tensioned together to form building units in a minimum of time and with a minimum of cost. They are particularly adapted to mass production which facilitates the reduction in cost.

The inherent economy of mass production has placed increasing emphasis in recent years on pre-cast construction made of concrete or the like. However, the industry is not advanced far in solving many of the problems associated with such modular construction. The use of modules has not in the past been fully coordinated with the arrangement of utility ducts and the like to provide the optimum in building construction. Examples of prior art modular construction of this general class are described in the following publications:

(1) Gillette, Roy W., "Precast Boxes Stacked to Build 496-Room Hotel in Nine Months for Hemisfair," Civil Engineering, March 1968, pp. 44–47.
(2) "Habitat 67's Housing Blocks Build a Better Environment." Engineering News-Record, June 16, 1966, pp. 84–86.
(3) Harper, W. W. and Ohl, Herbert, "Housing Research Program: Comprehensive Housing," Report 04.1, Research & Graduate Center School of Architecture, Texas A. & M. University, April 1966.
(4) "Hotel Construction Methods Receive National Acclaim," Texas Professional Engineer, January 1968, pp. 14–15.

None of the systems heretofore used have been as convenient, fast, inexpensive, maintenance free, vermin-proof, fireproof, soundproof and the like, as the present construction and method.

It is, therefore, an object of this invention to provide an improved building construction and method which constitutes a substantial improvement over the prior art.

Briefly stated, the invention for a building construction includes, in combination, a plurality of pre-cast, end-to-end mating, reinforced modules connected to form a building unit. Each of the modules is provided with at least two walls connected at substantially a right angle. Each wall of each of the modules has a plurality of ducts passing therein through in a direction transverse to the span; that is, in a direction which is generally parallel to the corner line formed at the juncture of said walls. The ducts of each module are so arranged that they mate when assembled together to form utility ducts therethrough. The invention also includes tensioning means connected to the modules for holding the modules together as a building unit in end-to-end relationship.

Certain embodiments of the invention may include seal means and tongue and groove means for sealing between mating ends of modules. In addition, certain mating ends of the modules may be provided with coving recesses about the perimeters thereof to form transverse ducts. The shape of the utility ducts is preferably annular and more particularly oblong in cross-section. The construction is such that means may be provided for covering the outside ends of the two outside modules in a building unit whereby utility ducts are closed, with the V end providing a channel or chaise for transverse channeling of utilities passing through the utility ducts.

The method of this invention contemplates a method of constructing a building unit including the steps of casting a plurality of modules in a generally ring-shaped form, with the form being ring-shaped in plan view. Each of the modules is arranged to have at least two walls meeting at a generally right angle to form a generally vertically extending corner line. It is also contemplated that uniformly spaced-apart, vertically-extending ducts will be formed through the walls of said modules during the casting thereof by initially inserting vertically-extending removal forms in the aforesaid ring-shaped form. The modules are reinforced during the casting thereof by initially supporting metal reinforcing members in the ring-shaped form at vertically spaced-apart intervals with the members being arranged to surround each of the ducts in the shape of a truss. Thereafter, a solidifiable aggregate is poured in the ring-shaped form around the vertically-extending forms and around the metal trusses.

The aggregate is thereafter cured to a hardened stage to produce individual modules. Then a plurality of such modules are assembled in end-to-end relationship. The modules are held together by applying tensioning forces to urge the modules together to form a building unit, whereby the ducts of the modules mate and form utility ducts running transverse to the span.

In certain embodiments the method may include the step of rotating the modules at 90° whereby the utility ducts extend generally horizontally from front to back in an assembled building unit. In other embodiments of the method of the invention, the modules may be formed in a generally L-shape by inserting dividers at two diagonally spaced-apart corners of the ring-shaped form, which modules are thereafter assembled by the aforesaid tensioning operation.

Reference to the drawings will further explain the invention wherein the like numerals refer to like parts and in which:

FIG. 6 is a perspective view showing a plurality of certain embodiments of the modules assembled as a building unit.

FIG. 7 is a view taken generally along line 7—7 of FIG. 6 and showing a seal means for the end of one of the modules.

FIG. 8 is an enlarged and partially fragmented side elevation view of the tensioning means shown holding the modules and taken along line 8—8 of FIG. 6.

FIG. 9 is an enlarged, fragmentary, cross-sectional view between two adjacent modules showing the seal means therebetween.

FIG. 10 is a perspective view showing a plurality of the building units assembled as a span.

FIG. 11 is a perspective view showing a plurality of the building units assembled in alternate stacked relationship.

FIG. 12 is a partial plan view showing in illustrative fashion the arrangement of the reinforcing trusses provided or cast into the modules.

FIG. 13 is a fragmentary cross-sectional view of two of the trussess shown in FIG. 12 and is generally taken along line 13—13 of FIG. 12.

FIG. 20 is a generally central, vertical, sectional view of the form shown in FIG. 19.

FIG. 21 is a view similar to FIG. 20, but showing the duct form in the retracted or collapsed condition.

Figures 1, 2:
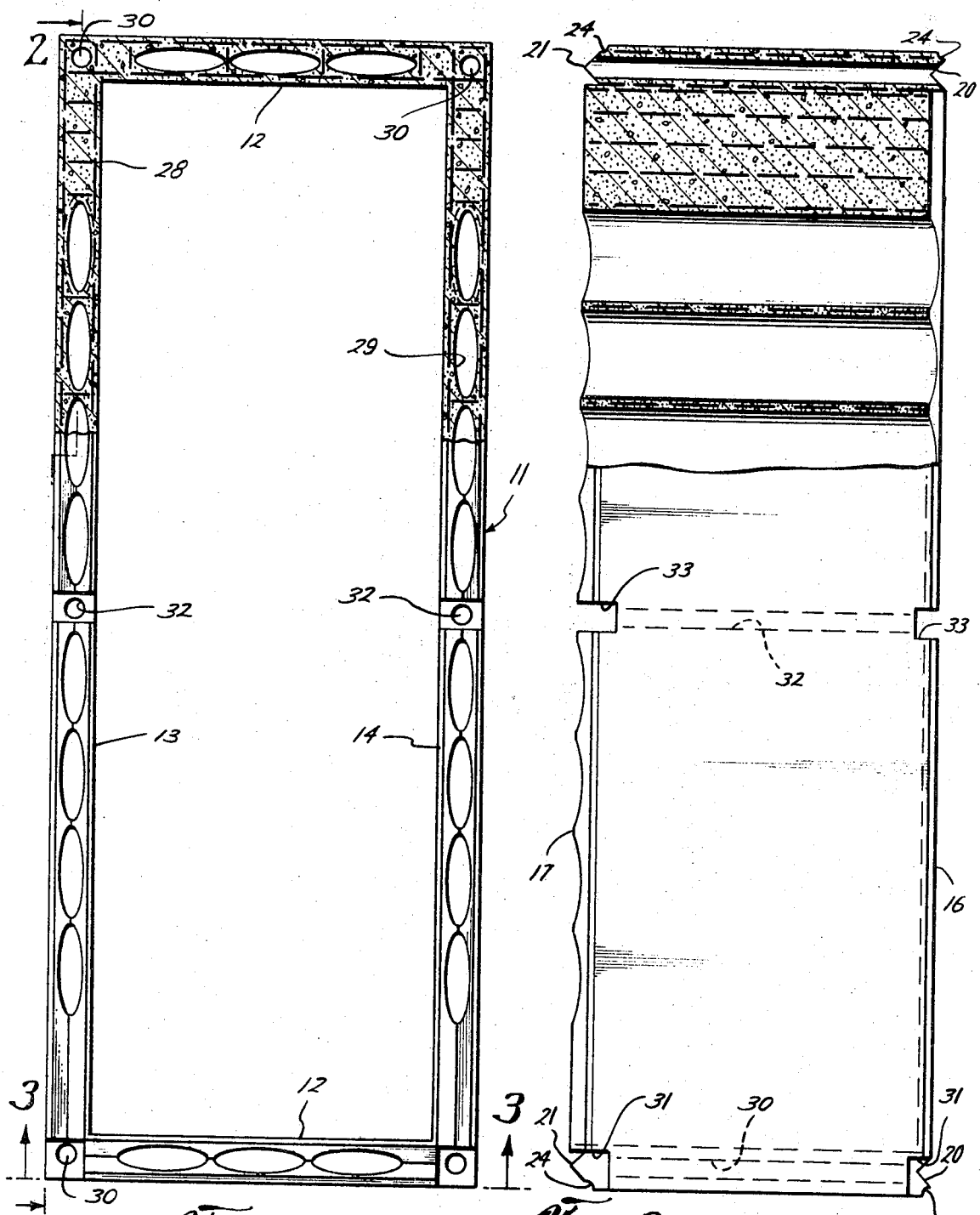
FIG. 1 is a top plan view, partially broken away, of a module as it would appear during the casting thereof, but with the concrete forms removed therefrom.
FIG. 2 is a view taken generally along line 2—2 of FIG. 1.

Referring now to the drawings, and FIG. 1 in particular, one embodiment of a building module of this invention is shown and designated generally by the numeral 11. It is in effect a concrete box with two of the longest opposing sides missing. This is the position of the module as it would appear immediately after the casting thereof with the casting forms removed therefrom. A typical dimension for such a module would be 24 feet in interior width, i.e., from top to bottom of the drawing as shown in FIG. 1, and an interior height, i.e., from left to right as shown in FIG. 1 of 10 feet. It is to be understood that the walls are approximately one foot thick. In addition, the module would have a depth of 8 feet as viewed from left to right in FIG. 2.

Stated another way, module 11 is generally rectangular and having two spaced-apart side walls 12 connected by top side 13 and bottom side 14, thereby forming what will in this application be referred to as a rectangular-shaped ring.

Referring now to FIG. 2, for the purposes of convenience, the right marginal edge of the module shown in FIG. 2 will be referred to as the front edge 16 and the marginal edge on the left will be referred to as the back edge 17. Front edge 16 may optionally be provided with a V-shaped groove 20 about the perimeter thereof and back edge 17 may optionally be provided with a V-shaped tongue 21 which is of matching configuration with tongue 20.

In addition, edges 16 and 17 are also provided with a coving groove 24 about the perimeter thereof, such that when two modules 11 are positioned in end-to-end relationship and two more modules 11 are stacked vertically thereover, there will result a common transverse duct 25 formed by the four mating coving grooves 24 as shown in 5A. Duct 25 provides a collecting trough for top units, helps to conceal or blend the down spouts, or simply provides a shadow line to add eye appeal to the finished structure.

In the broken away portion of FIGS. 1 and 2, steel reinforcing is shown and designated by the numeral 28, which can take many general forms, as will be discussed hereinafter. In any event, it provides reinforcing for the modules to give added strength thereto.

Each of the modules 11 also has a plurality of ducts passing through the walls and sides thereof in a direction generally transverse to the span, i.e. parallel to the corner lines with the ducts mating with the ducts of adjacent modules, forming utility ducts when assembled in a unit. More particularly, and referring to FIGS. 1 and 2 in particular, modules 11 are provided with annular and preferably oval-shaped ducts 29 which extend vertically during the casting of a module 11 and in a direction which has been described as being transverse to the span. The module 11 as shown in FIG. 11 may be rotated 90° during its assembladge as a building unit, and hence ducts 29 in the ceiling or top side 13 run transverse to the long span. Stated still a further way, the long axis of ducts 29 are generally parallel with the central axis of the ring formed by the four sides of the module 11.

Each corner of a module 11 is also provided with an annular tendon passage 30 which runs in a direction parallel with ducts 29 and may be formed in any conventional manner during the casting of the modules.

Figure 3:
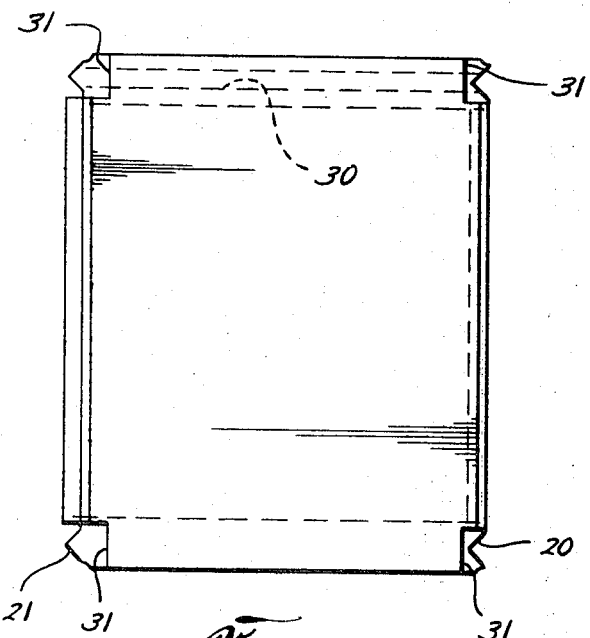
FIG. 3 is a view taken generally along line 3—3 of FIG. 1.

As best seen in FIGS. 2 and 3, each corner of certain of the modules 11 may be provided with tendon notches 31 to provide flat surfaces perpendicular to tendon passages 30 for positioning anchor plates. In addition, modules 11 may also be provided with intermediate tendon passages 32, as shown in FIG. 2, with each end thereof being provided with intermediate tendon recesses 33, also for the purpose of providing a place for the positioning of anchor plates if it is desired to use additional tendons to draw or apply additional tensioning force between two or more modules assembled in a unit.

Referring now to FIGS. 6 and 8 in particular, tensioning means connected to module 11 will be described, which means is arranged for holding the modules together as a building unit in end-to-end relationship. Modules 11 are rotated 90° from the casting position shown in FIG. 1 and aligned in end-to-end relationship generally as shown in FIGS. 6 and 8. Modules 11 are held together by tendon rods 35 passing through each of the tendon passages 30.

In the embodiment shown in FIGS. 6 and 8, two modules 11 are initially assembled in end-to-end relationship and a tendon rod 35 is passed through each of the tendon passages 30, and, if desired, also through tendon passages 32. The two outside notches 31 on each of the two modules 11 initially connected together are provided with butt plates 36 which are engaged by hex nut 37 on the left as viewed in FIG. 8 and a hex coupling nut 38 on the right. Thereafter, additional modules 11 are added to the unit simply by positioning a module 11 adjacent the previously assembled units, threading another tendon rod 35 into the coupling nut 38 and adding a hex nut 37 (or coupling nut 38) with another butt plate 36. By turning on the nut 37, the desired tension can be applied to force modules 11 together in tight-fitting, end-to-end relationship.

With building units assembled as shown in FIG. 6, they can thereafter be utilized to form multiple units thereof, such as a span configuration as shown in FIG. 10 or an alternate stacking arrangement as shown in FIG. 11, for example. It is to be noted that in the FIG. 11 example, the side walls of each of the units is load bearing and the arrangement is such that free spaces are provided between certain of the units, which cuts down on construction costs even further. The top free spaces can be closed by slabs or by inverted U-shaped members, if desired.

Referring now to FIG. 9, which is an enlarged view of the joint between two adjacent modules 11, it can be seen that groove end 16 meshes with tongue end 17. Seal means are provided in certain embodiments to seal against fluid passage through the space therebetween. This can conveniently take the form of a pair of partially embedded, neoprene cords 39 or the like which protrude a sufficient distance to engage in sealing relationship with the edge of the adjacent module 11, as shown.

Referring now to FIG. 7, the front edge of the leading module 11, as shown in FIG. 6, can be provided with an end seal cover 40, whereby the ducts 29 are thereby closed.

Figure 5A:
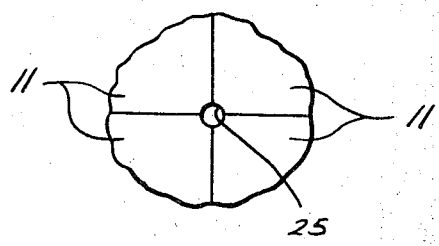
FIG. 5A is a fragmentary side elevation view of the meeting point of four adjacent modules, two of which have been stacked.
Figure 5:
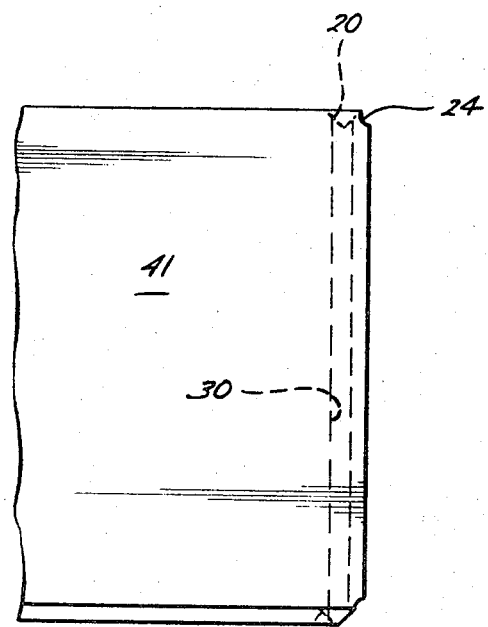
FIG. 5 is a partial side elevation view of a still further alternate embodiment of the invention.

Referring now to FIG. 5, an alternate embodiment of the module is shown in the form of module 41. This view is similar to the bottom end of the module 11 shown in FIG. 2, but module 41 is formed without tendon notches 31. This would be the design for an interior module which would be assembled with an adjacent module 41 on each end thereof and wherein the tensioning means took the form of the cable or rod passing lengthwise thereof without intermediate tensioning points, as in the embodiment shown in FIG. 8. Nevertheless, module 41 has similar design and configuration to modules 11, including coving grooves 24 and the like.

Referring now to FIGS. 12 and 13, the presently preferred reinforcing material for the modules consists of a plurality of rectangular trusses 43 formed of the steel reinforcing rods arranged to pass on alternate sides of ducts 29, as shown. In addition, oblong spiralls of reinforcing rod may be placed around each duct 29 if desired for added strength. These trusses may be spaced apart by U-shaped stacking spacers 44, the bottom ends of which may be welded to a truss 43 so as to support the truss immediately thereabove as shown in FIG. 13, during the casting operation.

Figure 17:
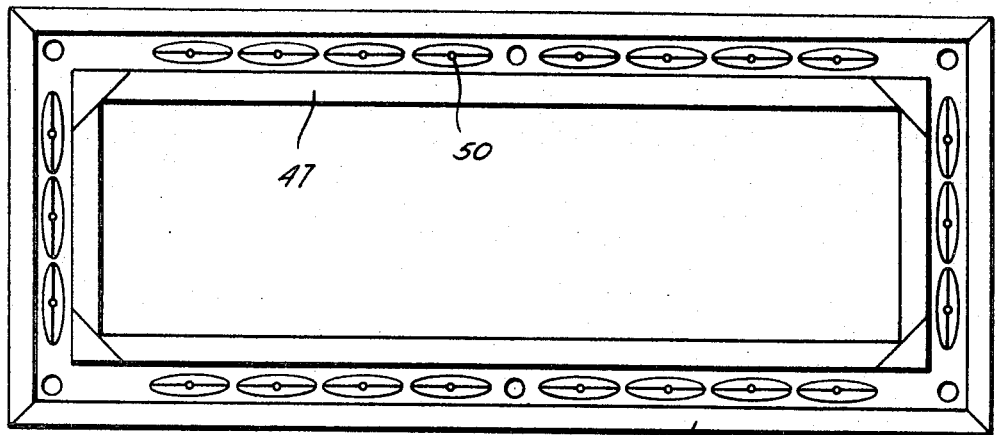
FIG. 17 is a top plan view showing one of the ring-shaped modules being cast in a ring-shaped form.
Figure 18:
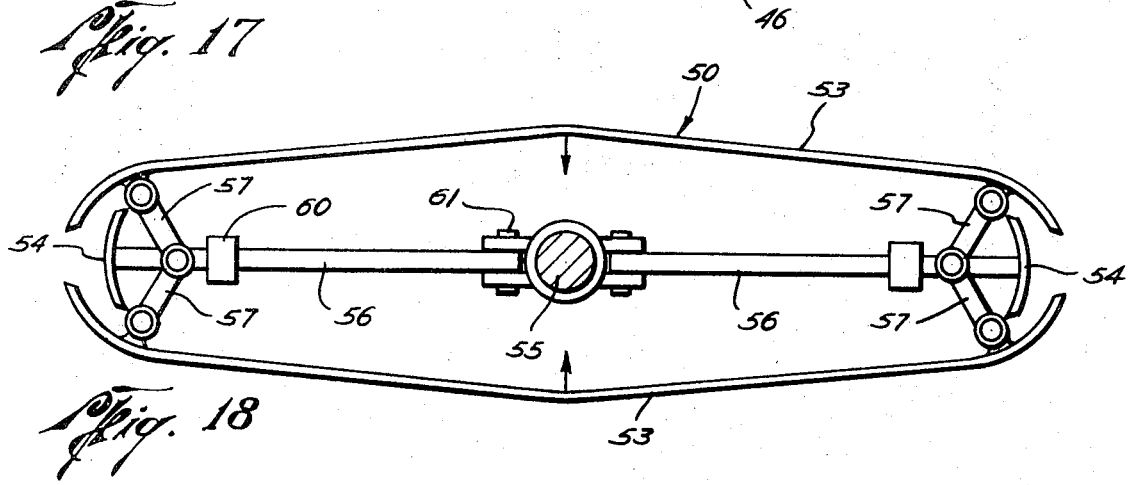
FIG. 18 is a top plan view, in enlarged dimensions, of one of the oblong ducts used to form the aforesaid utility ducts, with the form being shown in the collapsed or retracted position.

Referring now to FIG. 17, modules of this invention are formed by casting in a generally rectangular ring-shaped mold consisting of an external mold form 46 and an internal mold form 47 which may be of conventional design, leaving a space therebetween of a thickness comparable to the thickness of the walls of the module which is being formed. Forms 46 and 47 are mounted on a conventional casting base. Thereafter, oval-shaped forms generally designated by the numeral 50 are uniformly spaced in the area between forms 46 and 47 at the desired location to form the utility ducts 29 referred to above with forms 50 in place and trusses 43 in place in the space between forms 46 and 47, and with tubes to form tendon passages 20 and 30 also in place, concrete may thereafter be poured and permitted to set up.

Figure 19:
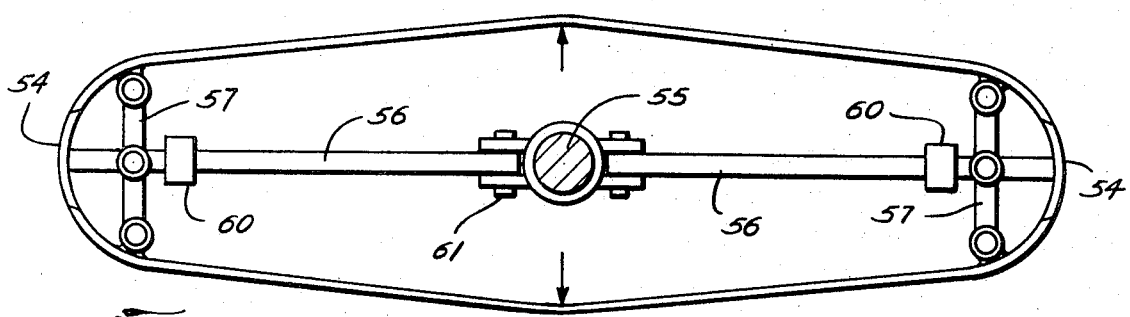
FIG. 19 is a top plan view of the form shown in FIG. 18, but expanded into the position ready for pouring of aggregate.

The FIGS. 18-21 show one suitable collapsible-type oval form 50 which can be used to form the ducts 29, which forms are comprised of curved sides 53 and arcuate end pieces 54. It is to be understood that sides 53 and pieces 54 may be made of metal or any other material having strength sufficient to exclude the aggregate from the void created by the form. Sides 53 are arranged to be extended to the expanded position and the end spaces therebetween closed by pieces 54 by a camming action operating through actuating rod 55 extending vertically therethrough. Rod 55 has pivotally connected thereto, as by wrist pins or the like, a plurality of strut rods 56 which are connected the outward ends to one of the end pieces 54. Each of the strut rods 56 also has pivotally attached thereto a pair of cam rods 57, each of which connects to a side 53, as shown. By exerting a downward force in the direction of arrow 59 in FIG. 20, struts 56 are caused to move sides 53 into the engaged position, as shown in FIG. 19 and, at the same time, sides 53 are cammed outwardly. Hence, FIGS. 19 and 20 show the form 50 in the pouring position. It is to be understood that struts 56 are provided with wrist pins 60 and 61 to facilitate the aforesaid pivoting action. Forms 50 may be removed from the cast module after the aggregate or concrete is set up by pulling on rod 55 in the direction of arrow 62, as shown in FIG. 21, which collapses the form so that it may be withdrawn from the duct 29 formed thereby.

Figure 4:
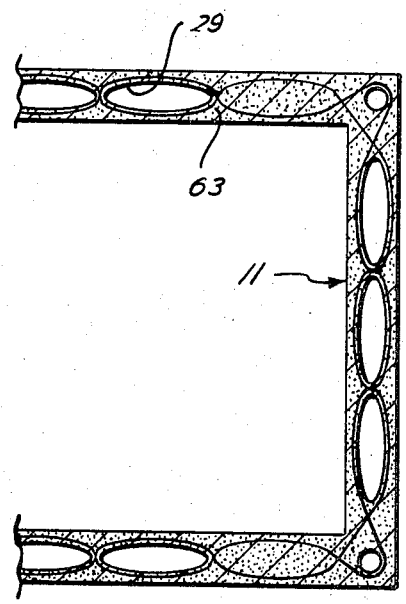
FIG. 4 is a fragmentary plan view of an alternate embodiment of the invention.

FIG. 4 shows an alternate embodiment for the reinforcing utilized in a module and can take the form of a plurality of cables 63 woven around each of the ducts 29 which, in effect, gives a truss shape.

Figure 14:
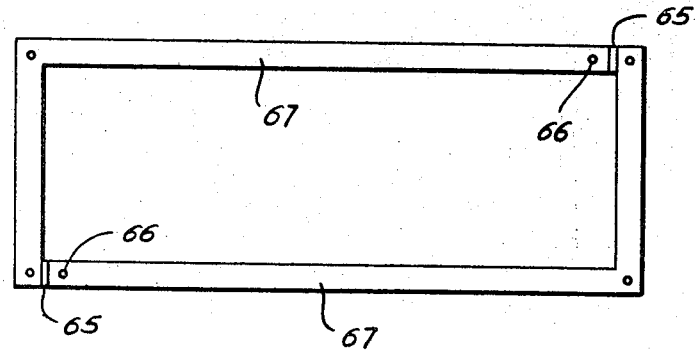
FIG. 14 is a top-plan view of an alternate method of performing the invention to provide two L-shaped modules with each casting.
Figure 15:
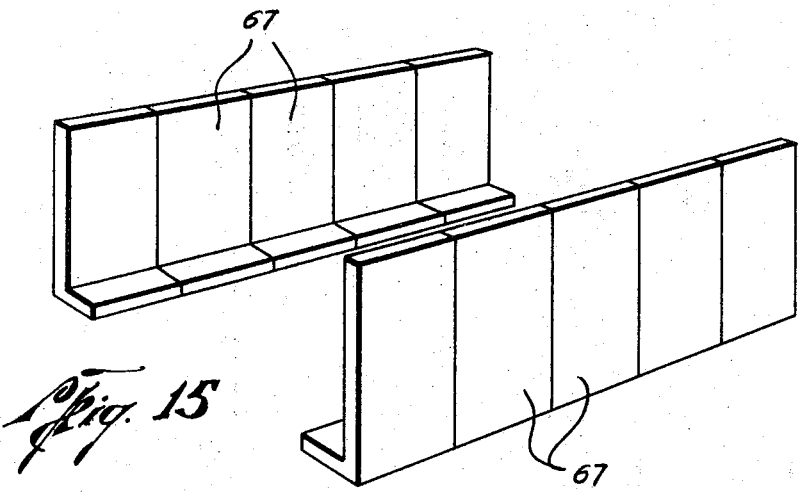
FIG. 15 is a perspective view of two spaced-apart building units formed by a plurality of the aforesaid L-shaped modules.
Figure 16:
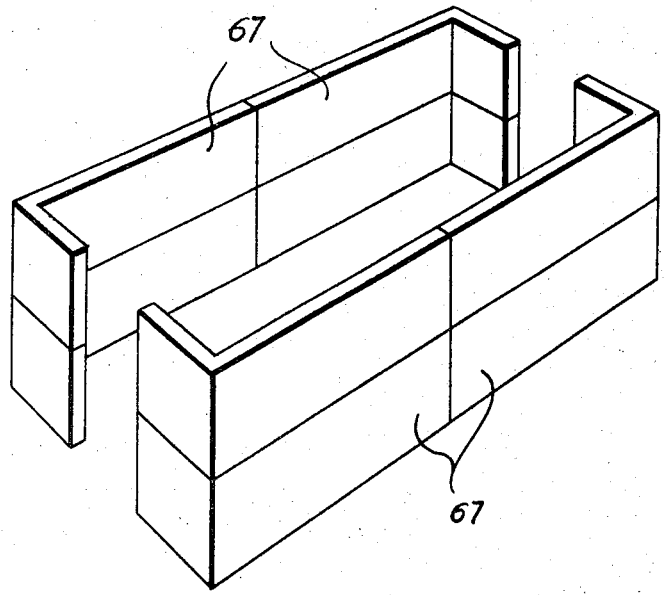
FIG. 16 is a still further embodiment of building units constructed out of the aforesaid L-shaped modules.

Referring now to FIGS. 14 and 16 in particular, occasionally it will be desirable to cast modules which are L-shaped in plan view, such as those shown in FIGS. 14-16. This is accomplished by inserting dividers 65 at diagonally opposite corners of the ring-shaped pouring form, as shown in FIG. 14. In addition, additional tendon holes 66 may be provided in the ends of the long span for tensioning purposes, just as with tendon passages 30.

The L-shaped modules 67 thus formed, when cured, can be assembled in the manner shown in FIG. 15 by tensioning means the same as with the ring-shaped modules, to form free-standing, permanent fences. Alternatively, they may be stacked vertically in the manner shown in FIG. 16, with vertical ducts that may go quite high, which ducts may be used for concealed pilasters by inserting steel rods therein and pouring the ducts full of concrete.

By way of summary, the modules of this invention which are ring-shaped can be assembled as shown in FIG. 6, for example, with as many as eight modules to form a compartment 64 feet in depth. This space would be unencumbered by columns or load-bearing walls, lending itself to any arrangement of moveable interior space dividers or partitions. The positioning of a number of compartments would have almost infinite variations in forming complexes such as those shown in FIGS. 10 and 11. By use of the method of this invention, building units could be cantilevered, free standing 40 feet or more, and spans of 80 feet or more are possible. This invention provides opportunities to achieve architectural effects normally prohibited by cost when using ordinary method. Very large, clear span areas for restaurants, assembly rooms and the like can be achieved by spanning several units over two-unit (or more) stack of ordinary units serving as end walls.

These units are particularly well-suited for high-rise buildings, since they bear layer upon layer and structural problems normally common to buildings using steel skeletons and masonry walls with the reactions and varying movements are eliminated by this method.

The V-groove locking feature described above between adjacent modules allows freedom of segmenting out the end walls, thus permitting the casting of an elongated C-shaped module to provide access through the side thereof to an adjoining room or patio area, for example.

When stacked as shown in FIG. 11, there is provided as much as from 30 to 45 percent free spaces, except for curtain walls which are normally used to close open ends of the building units in any arrangement.

The open utility ducts 29 at the front of the building are readily adaptable to special treatment to create variety in facade, or lightweight roofs can be snapped in, and decks of a wide variety of material could be cantilevered from the duct openings.

As stated above, the groove end of the end module in a unit is adaptable as a chaise for utility lines to be concealed until they are turned into the desired utility duct for service outlet. An inverted V covering could be used to close the chaise, for example, and assume the same appearance as the opposite end of the building unit.

The unique design of the covering groove around the outside perimeter of the ring-shaped modules, when they are joined together, provides a collecting trough for top units, help to conceal or bend downspouts, or simply provide a shadow line as stated above.

The present method provides increased speed in construction. The building of these units utilizing zero-slump concrete during the casting thereof and the introduction of steam to promote curing provides a ready technique whereby the building of a unit can be completed very quickly. The optimum use of this concept allows for an arrangement where each ring would be moved only once, from casting pad into the building, where mechanical contractors and other trades would do their work at a rate of speed matching the casting machine.

This invention provides a construction method which is very fast, the end result of which is a permanent, inexpensive, virtually maintenance-free, verminproof, fireproof, soundproof, and perhaps even tenantproof construction. It is susceptible of an infinite variety of stacking arrangements and is adaptable for use in almost any type building.

Further modifications may be made in the invention without departing from the scope thereof. Accordingly, the foregoing description is to be construed as illustratively only and is not to be construed as a limitation upon the invention as defined in the following claims.

What is claimed is:
1. In a building construction, the combination comprising:
  a plurality of pre-cast end-to-end mating reinforced modules connected to form a building unit, each of said modules having at least two walls meeting at substantially a right angle, and each wall of each of said modules having a plurality of ducts passing therethrough in a direction generally parallel to the corner line formed at the juncture of said walls, with said ducts mating with the ducts of adjacent modules forming utility ducts therethrough;
  the mating ends of each of said modules being provided with coving recesses about the perimeters thereof;
  tensioning means for holding said modules together as a building unit in said end-to-end relationship; and
  means mounted with said modules for receiving said tensioning means in said walls adjacent said ducts.
2. The invention as claimed in claim 1 wherein:
  each of said modules having at least one addition wall which is connected to one of said first two walls at a generally right angle, to form a C-shaped structure, said additional wall having a plurality of ducts passing therethrough in a direction generally parallel with said ducts in said first two walls.
3. The invention as claimed in claim 1 wherein:
  each of said modules includes four walls connected to form a rectangular configuration, with each of said walls having a plurality of ducts passing therethrough in a direction generally parallel with the corner lines formed at the juncture of said walls.
4. A building construction as claimed in claim 3 including:
  at least two of said units, with one unit mounted on top and supported by the other unit, and with said corner lines running generally horizontal.
5. The invention as claimed in claim 4 including:
  a plurality of said units arranged in an alternate stacked condition to provide free spaces therebetween.
6. The invention as claimed in claim 1 wherein:
  one end of each module is provided with a tongue configuration and the other end thereof a mating groove configuration, whereby the tongue of one module is received in the groove of the adjacent module.

7. The invention as claimed in claim 1 including:
  seal means mounted between mating ends of said modules for sealing the space between said mating ends.
8. The invention as claimed in claim 7 wherein:
  said seal means includes a partially embedded resilient member extending substantially around at least one end of each of said modules, said resilient member protruding a distance sufficient to make sealing contact with an adjacent module in the assembled condition.
9. The invention as claimed in claim 1 wherein:
  at least the two outside modules in said building unit are provided with tendon notches at each corner of the outside ends thereof for receiving said tensioning means.
10. The invention as claimed in claim 1 wherein:
  said utility ducts are annular in cross-section.
11. The invention as claimed in claim 10 wherein:
  said utility ducts are oblong in cross-section.
12. The invention as claimed in claim 1 including:
  means for covering the outside ends of the two outside modules in said building unit whereby said utility ducts are closed.
13. The invention as claimed in claim 1 wherein said tensioning means includes:
  tendon rods passing through and parallel with the corners of each of said modules, each of said rods having both ends threaded; and
  nuts threaded on each end of each of said rods and arranged to engage said modules and apply tension forces which hold said modules together, with at least one of said nuts being a coupling nut having threads arranged to engage on axially adjacent rod.
14. The invention as claimed in claim 1 wherein:
  each of said modules is reinforced by a plurality of spaced-apart metal trusses extending generally transverse to the direction of said utility ducts.
15. The invention as claimed in claim 14 wherein:
  each of said modules is formed with two side walls and top and bottom sides to provide a generally rectangular ring shape;
  and after casting, each of said modules is rotated 90° whereby said utility ducts extend generally horizontally from front to back in said assembled building unit.
16. The invention as claimed in claim 14 including:
  initially inserting vertically extending dividers at two diagonally spaced-apart corners of said ring-shaped form, whereby two generally L-shaped modules are formed during each casting operation.

References Cited
UNITED STATES PATENTS

| | | | |
|---|---|---|---|
| 2,691,291 | 10/1954 | Henderson | 52—79X |
| 2,808,624 | 10/1957 | Sullivan | 52—403 |
| 3,156,018 | 11/1964 | Slayter | 52—79X |
| 3,201,907 | 8/1965 | Henderson | 52—73 |
| 3,430,398 | 3/1969 | Green | 52—79X |
| D. 179,185 | 11/1956 | Branham. | |
| 952,080 | 3/1910 | McIntyre. | |
| 1,272,139 | 7/1918 | Stanley. | |
| 1,579,285 | 4/1926 | Danaher et al. | |
| 1,583,921 | 5/1926 | Garber. | |
| 1,683,441 | 9/1928 | Bone. | |
| 1,727,362 | 9/1928 | Bone. | |
| 1,727,363 | 9/1929 | Bone. | |
| 2,184,137 | 12/1939 | Brewer. | |
| 2,319,203 | 5/1943 | Branham. | |
| 2,666,974 | 1/1954 | Leanse. | |
| 2,696,729 | 12/1954 | Vander Heyden. | |
| 2,966,009 | 12/1960 | Koch. | |

(Other references on following page)

UNITED STATES PATENTS

| | | |
|---|---|---|
| 3,172,932 | 3/1965 | Vander Heyden. |
| 3,283,457 | 11/1966 | Hart. |
| 3,416,281 | 12/1968 | Kopp. |

FOREIGN PATENTS

| | | | |
|---|---|---|---|
| 766,840 | 9/1967 | Canada | 52—79 |
| 527,562 | 7/1921 | France | 52—227 |
| 503,427 | 7/1930 | Germany | 52—220 |
| 865,652 | 2/1953 | Germany | 52—79 |
| 875,279 | 8/1961 | Great Britain | 52—382 |

OTHER REFERENCES

Civil Engineering, March 1968, pp. 44–47, 52–79.

Engineering News-Record, TA1E61, Feb. 26, 1959, pp. 44, 45, 52–79.

Engineering News-Record, TA1E61, June 16, 1966, pp. 84–86, 52–79.

ALFRED C. PERHAM, Primary Examiner

U.S. Cl. X.R.

52—220, 227, 236